2 Sheets—Sheet 1.

J. O. SCHUSTER.
GRAIN-BINDER.

No. 180,377. Patented July 25, 1876.

WITNESSES:
W. W. Hollingsworth

INVENTOR:
John O. Schuster
BY
ATTORNEYS.

2 Sheets—Sheet 2.

J. O. SCHUSTER.
GRAIN-BINDER.

No. 180,377.     Patented July 25, 1876.

WITNESSES:
W. W. Hollingsworth
John C. Kenon

INVENTOR:
John O. Schuster
BY
ATTORNEYS.

UNITED STATES PATENT OFFICE.

JOHN O. SCHUSTER, OF LONG PRAIRIE, ILLINOIS.

IMPROVEMENT IN GRAIN-BINDERS.

Specification forming part of Letters Patent No. 180,377, dated July 25, 1876; application filed May 3, 1876.

*To all whom it may concern:*

Be it known that I, JOHN O. SCHUSTER, of Long Prairie, in the county of Wayne, and State of Illinois, have invented a new and Improved Grain-Binder; and I do hereby declare that the following is a full, clear, and exact description of the same, reference being had to the accompanying drawing, forming part of this specification, in which—

Figure 1:
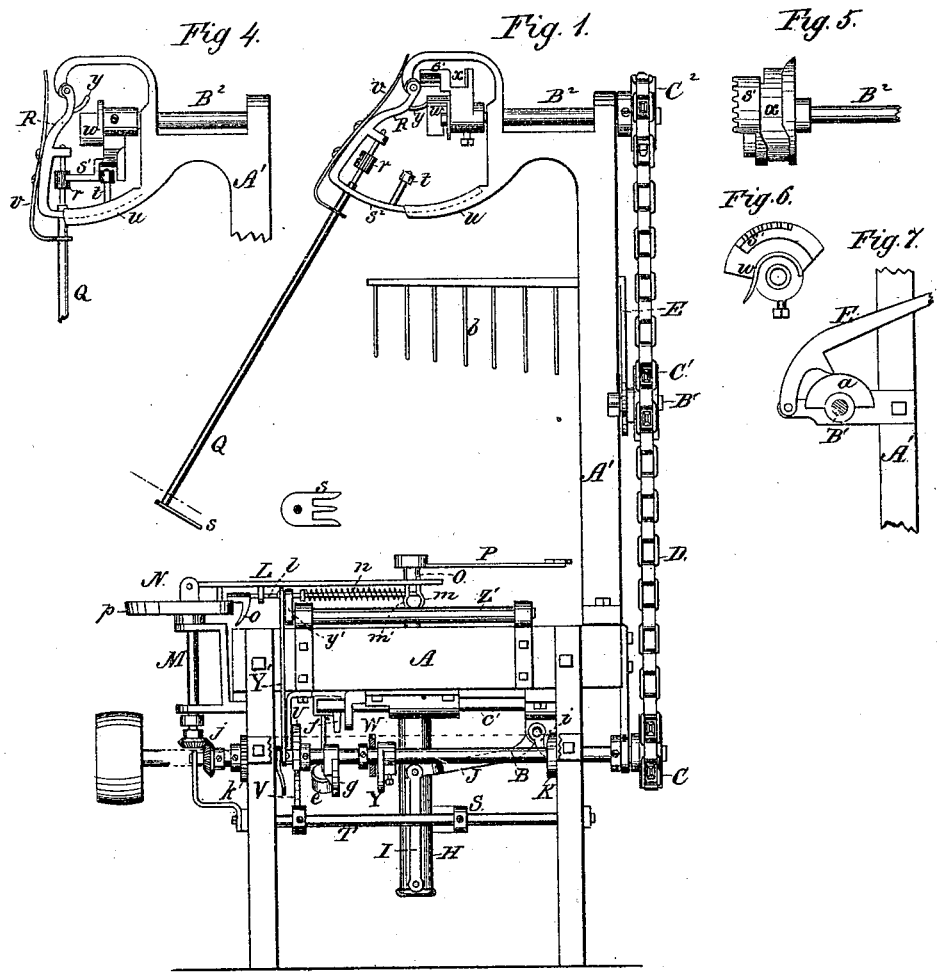
Figure 2:
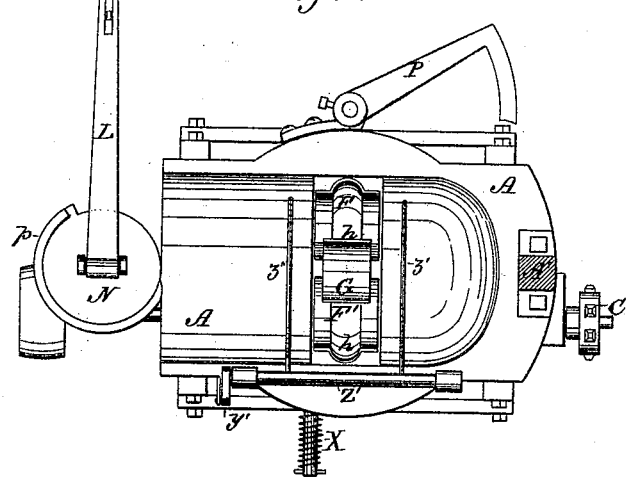
Figure 3:
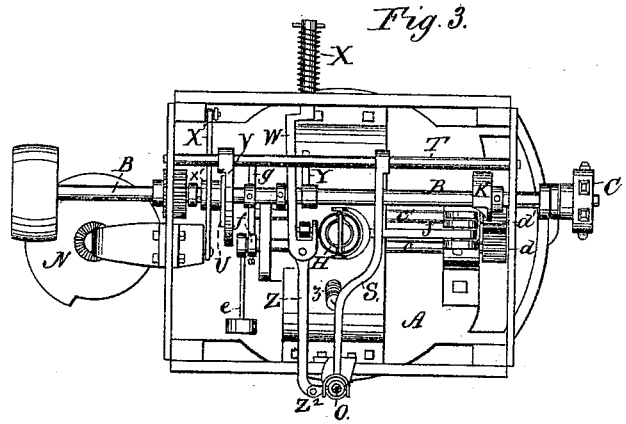

Figure 1 is a side elevation; Fig. 2, a plan view; Fig. 3, an inverted plan; Fig. 4, a detail of the devices for operating the "twister," showing the latter in position for rotating; Figs. 5 and 6, other details of twister devices; Fig. 7, detail of cut-off devices.

My invention relates to a novel construction of grain-binder; and it consists in a set of devices adapted to be placed upon the harvester-table in a position to receive the cut grain from the elevator-apron, which devices are so constructed as to hold back the accumulating grain until a sufficient gavel has been obtained, when it is admitted to a trough, where, by a series of consecutive movements, it is clamped and tied with a wisp of its own straw, and the bundle thrown out ready to receive another gavel, all as hereinafter more fully described.

In the drawing, A represents the table, which is made with a concaved or trough-like upper surface, and A' is an upright support placed upon the table, and designed to carry a portion of the operating devices. B B¹ B² are the three main shafts, the first of which, B, is journaled in bearings under the table, and carries the greater part of the working devices, and the second of which, B¹, is located midway upon the support A', and carries the re or cut-off, the third, B², being located at the top, and designed to operate the devices for twisting the wisp of straw about the bundle before tucking it under to complete the binding. All of these shafts carry notched rag-wheels C C¹ C², which are all geared together by a chain belt, D, motion being imparted to the same through a pulley upon the main lower shaft B. Upon the middle shaft B¹ is located a semicircular cam *a*, which, in its revolution, strikes a projection upon a pivoted arm, E, which carries a rake or cut-off, *b*, so that for one-half a revolution the cut-off is up, and for the other half it is down. This cut-off being arranged at the top of the elevator-belt, the cut grain will accumulate against the side of the same for half a revolution, and the gavel thus formed will, during the other half of the revolution, be admitted to the trough of the table. F F' are two semicircular clamps, arranged in a recess in the bottom of the trough, which clamps are attached to two parallel shafts, *c c'*, geared together by pinions *d d'*, so as to cause them both to work in unison and clamp the bundle in the middle of the trough. One of these shafts, *c*, is provided with a counter-balance, *e*, and a tappet, *f*, which counter-balance habitually holds the clamps F F' open, except when the tappet *f* is struck by a semi-cylindrical cam, *g*, on the main shaft B, to close them. The said clamps are provided with a circumferential groove or depression, *h*, upon the inside, to accommodate the wisp of straw forming the binder, and the ends of the clamps are so constructed as to leave, when closed, a circular opening, through which the ends of the binder project when they are ready to be twisted and tucked under. G is the bundle-adjuster, whose function is to adapt the clamping devices to operate successfully upon small gavels produced in harvesting thin grain. It consists of a curved plate mounted upon the top of a spring-seated stem, which is contained and slides in a pendent barrel, H. The said plate G is connected through its stem with the outside slide-rods I, which, in turn, are pivoted to a lever, J. This lever is provided with an arm, *i*, which is struck by a cam, K, on the main shaft, to deflect the same and elevate the spring-seated plate G. The object of this arrangement is to adapt the clamps to compress different-sized bundles, and keep the smaller bundles in the upper portion of the clamps, where they can be operated upon by the binding devices, and for this purpose the cam K on the main shaft may be so adjusted as to cause the plate G to rise and co-operate with the clamps in binding small bundles, the said plate and its stem being spring-seated, so as to cause it to have a slight automatic adjustment to inequalities in the bundles. L is an arm, which seizes a wisp of straw from the gavel with which to bind the bundle. Said arm is hinged or pivoted to a shaft, M, so as to move vertically upon its pivot, and the said shaft is connected through bevel-gear wheels $j$ and pinions $k$ with the main shaft, so that as the shaft M revolves the arm L is carried with it. To the under side of arm L is attached a slide-rod, $l$, which carries at its outer extremity a griping-finger, $m$, which binds, by reason of a spring, $n$, with another finger, $m'$, which also operates as a guide for one end of the slide-rod. The other end of said rod is provided with a projection, $o$, which binds against a cam-plate, N, which is fixed and stationary near the top of the shaft M. This cam N is of a disk shape, and has a raised edge, $p$, upon the more eccentric portion of the disk, the said disk being arranged horizontally. Now, as the arm L revolves, the projection $o$ of the slide-rod passes upon the raised eccentric portion $p$ of the cam N, and the griping-fingers $m$ $m'$ are held open. As the said fingers strike the end of the gavel projection $o$ passes off the raised portion $p$ of the cam, and the spring $n$ causes the finger $m$ to clamp and hold the wisp of straw with which the bundle is to be bound. As the arm continues in its revolution the wisp of straw is bent by a shaft, O, so as to occupy a position directly across the trough and above the clamps. At this instant the projection $o$ passes upon the eccentric portion $p$ of the cam N, and the fingers $m$ $m'$ are opened thereby; the wisp of straw is dropped upon the opened clamps just before the dumping of a gavel of grain thereupon.

Q is the twister, which, when the handle is clamped, with the ends of the wisp or binder projecting up through the open space between the clamps, approaches, and seizes the said ends, and, after twisting the same, delivers them to the tucker, to have the ends secured by being tucked under the binder. The said twister consists of a revolving rod, Q, carrying a head, $s$, provided with tines, which pierce the ends of the binder in order to secure a hold. The rod Q is journaled in a pivoted frame, R, and carries a pinion, $r$, which is rotated by a segment, $s^1$, of a crown-wheel carried by shaft $B^2$. The frame R is provided with an arc-shaped slide, $s^2$, carrying a friction-roller, $t$, which slide moves in corresponding guideways $u$, and is also further provided with a spring, $v$, which forces the slide into said guides. The shaft $B^2$, besides carrying the crown-wheel, carries also a cam, $w$, Fig. 6, and a boss with a cam-groove, $x$, Fig. 5, so that, as the shaft revolves, (the roller $t$ being in groove $x$, Fig. 4,) the segment $s$ of the crown-wheel meshes with the pinion $r$, and, by rotating the rod Q, twists the ends of the binder, and, as the roller reaches the bend of the groove, the twisted ends are delivered to the tucker. After this operation the cam $w$ strikes a stud, $y$, and throws the twister, with its slide and pinion, back upon its pivot, and away from the bundle.

P is the "tucker," which consists of an arm with an arc-shaped offset, which is attached to the shaft O. The said shaft is arranged to move both longitudinally and upon its axis. The first movement is effected by a lever, S, held up by a spring, $z$, and attached to a rock-shaft, T, which rock-shaft is worked by the operation of a cam, U, of the main shaft upon an arm, V, of the rock-shaft.

To produce the rotary oscillating movement of shaft O, to operate the tucker, a frame, W, is slotted, and arranged about the main shaft B. A spring, X, draws this frame in one direction, while a cam, Y, on the main shaft urges it in the opposite direction. This frame is connected, through pitman Z, with the shaft O by means of a feather-and-groove connection, $Z^2$, which compels the oscillation of the shaft, but still permits it to descend longitudinally, so as to bring the tucker to the proper level for its operation upon the ends of the binder. $Z^1$ is the "bundle-discharger," which consists of a rock-shaft journaled in bearings by the side of the trough, and having curved arms $z'$ fitting in the bottom of the same. This shaft is provided with a crank, $y'$, to which is attached a connecting-rod, $Y'$, and the said connecting-rod is pivoted below to a lever, $X'$, which is operated upon by a cam, $x'$, upon the main shaft, to rock the shaft $Z^1$, and throw the bundle out of the trough after it has been bound.

The general operation of the machine is as follows: The arm L seizes a wisp of straw from the gavel, and drops it transversely upon the trough, above the clamps, and the gavel is then admittted by the elevation of the rake or cut-off, the weight of the gavel bending and forcing the wisp or binder into the groove in the clamps. The latter then close and compress the bundle, leaving the ends of the binder projecting between the clamps. The twister then approaches, and seizes the ends of the binder, and, after twisting the same, delivers them to the tucker, which forces the ends under the binder, and thus secures the bundle, which is then thrown out by the bundle-discharger. The machine thus binds grain, with a portion of its own straw, into bundles of any size; and, as there is not the strain of pulling upon the wisp or binder during the operation of binding, as in hand-binding, a weaker and poorer quality of straw can be bound with a wisp of the same bundle than could be used by hand, as there is no strain upon the binder, except that of expansion after the bundle is bound.

Having thus described my invention, what I claim as new is—

1. The combination of a horizontally-rotating arm, L, carrying griping attachment for seizing the wisp, with a pair of clamps, F F', for compressing the gavel, a twister, Q, for twisting the ends of the binder, and a horizontally-oscillating and vertically-reciprocating tucker, P, substantially as and for the purpose described.

2. The combination, with the clamps F F′, of the adjustable spring-seated plate G, forming a bundle-adjuster, substantially as and for the purpose described.

3. The bundle-adjuster, consisting of a plate, G, provided with a stem and spring, in combination with the containing-barrel H, rod I, lever J, arm $i$, and cam K, substantially as described, and for the purpose set forth.

4. The shafts $c\ c'$, geared together, and carrying the clamps F F′, in combination with the counter-balance $e$, for opening, and the tappet $f$ and the cam $g$ for closing, the clamps, as described.

5. The arm L, having the slide-rod $l$, spring $n$, griping-fingers $m\ m'$, and projection $o$, in combination with the rotating shaft M, and the cam N, substantially as described.

6. The tucker P, consisting of a horizontal arm with curved offset, as described, in combination with the shaft O, arranged to oscillate horizontally, and move longitudinally in vertical direction with said tucker, substantially as and for the purpose described.

7. The combination of tucker P, shaft O, connection $Z^2$, pitman Z, frame W, spring X, and cam Y, for the purpose described.

8. The combination of tucker P, shaft O, lever S, spring $z$, rock-shaft T, arm V, and cam U, for the purpose set forth.

9. The shaft $B^1$, having cam $a$ and rag-wheel $C^1$, operated by a chain, in combination with the pivoted arm E, carrying cut-off $b$, as and for the purpose described.

10. The combination of the twister-carrying pinion $r$ with the pivoted frame R, carrying roller $t$ and stud $y$, and the shaft $B^2$, carrying segmental crown-wheel $s^1$, cam $w$, and groove $x$, as and for the purpose described.

JOHN O. SCHUSTER.

Witnesses:
  C. S. MITCHELL,
  WILLIAM GOOD.